United States Patent
Moshrefi et al.

(10) Patent No.: US 8,681,202 B1
(45) Date of Patent: *Mar. 25, 2014

(54) SYSTEMS AND METHODS FOR IMPLEMENTING INTERNET VIDEO CONFERENCING USING STANDARD PHONE CALLS

(75) Inventors: Afshin Moshrefi, Newburyport, MA (US); Reza Ghaffari, Chesnut Hill, MA (US)

(73) Assignee: Verizon Data Services LLC, Temple Terrace, FL (US)

( * ) Notice: Subject to any disclaimer, the term of this patent is extended or adjusted under 35 U.S.C. 154(b) by 1868 days.

This patent is subject to a terminal disclaimer.

(21) Appl. No.: 10/820,966

(22) Filed: Apr. 8, 2004

Related U.S. Application Data

(63) Continuation of application No. 10/083,607, filed on Feb. 26, 2002, now Pat. No. 6,750,897.

(60) Provisional application No. 60/312,910, filed on Aug. 16, 2001.

(51) Int. Cl.
*H04N 7/15* (2006.01)

(52) U.S. Cl.
CPC ...................................... *H04N 7/15* (2013.01)
USPC .................. 348/14.08; 348/14.09; 348/14.12

(58) Field of Classification Search
USPC ............ 348/14.01–14.09, 14.1, 14.11, 14.12, 348/14.13; 379/93.07, 202.01; 370/260, 370/261, 352; 709/204
See application file for complete search history.

(56) References Cited

U.S. PATENT DOCUMENTS

| | | |
|---|---|---|
| 4,013,839 A | 3/1977 | Bell |
| 4,540,850 A | 9/1985 | Herr et al. |
| 4,600,814 A | 7/1986 | Cunniff et al. |
| 4,924,496 A | 5/1990 | Figa et al. |
| 5,014,303 A | 5/1991 | Velius |
| 5,168,515 A | 12/1992 | Gechter et al. |
| 5,222,125 A | 6/1993 | Creswell et al. |
| 5,274,700 A | 12/1993 | Gechter et al. |
| 5,327,486 A | 7/1994 | Wolff et al. |
| 5,329,578 A | 7/1994 | Brennan et al. |

(Continued)

FOREIGN PATENT DOCUMENTS

| | | | |
|---|---|---|---|
| EP | 0818908 A2 | 1/1998 | |
| EP | 0818908 A2 | 1/1998 | .............. H04L 29/06 |

(Continued)

OTHER PUBLICATIONS

"MP3 Recorder Download—MP3 Recorder—Record Audio Stream to MP3 or WAV," 2002, http://www.mp3-recorder.net.

(Continued)

*Primary Examiner* — Melur Ramakrishnaiah

(57) ABSTRACT

A video conferencing system (100) includes a switch (125), a server (140), a telephony device (152), and a node (102) in a packet-switched network (135). The switch (125) establishes a circuit-switched connection between a calling party number and a called party number. The server (140) associates first and second network addresses in a packet-switched network (135) with each of the called party and calling party numbers. The telephony device (152) transmits audio data via the circuit-switched connection. The node (102) in the packet-switched network (135) transmits packetized video between the first and second network addresses responsive to establishment of the circuit-switched connection.

20 Claims, 7 Drawing Sheets

(56) References Cited

U.S. PATENT DOCUMENTS

| | | |
|---|---|---|
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,550,907 A | 8/1996 | Carlsen |
| 5,586,173 A | 12/1996 | Misholi et al. |
| 5,588,037 A | 12/1996 | Fuller et al. |
| 5,608,788 A | 3/1997 | Demlow et al. |
| 5,623,541 A | 4/1997 | Boyle et al. |
| 5,631,904 A | 5/1997 | Fitser et al. |
| 5,638,434 A | 6/1997 | Gottlieb et al. |
| 5,652,789 A | 7/1997 | Miner et al. |
| 5,661,788 A | 8/1997 | Chin |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,905 A | 4/1998 | Pepe et al. |
| 5,745,561 A | 4/1998 | Baker et al. |
| 5,751,800 A | 5/1998 | Ardon |
| 5,752,191 A | 5/1998 | Fuller et al. |
| 5,764,901 A | 6/1998 | Skarbo et al. |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A | 2/1999 | Glaser et al. |
| 5,875,437 A | 2/1999 | Atkins |
| 5,903,845 A | 5/1999 | Buhrmann et al. |
| 5,907,547 A | 5/1999 | Foladare et al. |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,926,535 A | 7/1999 | Reynolds |
| 5,944,769 A | 8/1999 | Musk et al. |
| 5,963,925 A | 10/1999 | Kolling et al. |
| 5,982,870 A | 11/1999 | Pershan et al. |
| 6,005,870 A | 12/1999 | Leung et al. |
| 6,018,571 A | 1/2000 | Langlois et al. |
| 6,018,737 A | 1/2000 | Shah et al. |
| 6,029,151 A | 2/2000 | Nikander |
| 6,031,896 A | 2/2000 | Gardell et al. |
| 6,058,163 A | 5/2000 | Pattison et al. |
| 6,061,432 A | 5/2000 | Wallace et al. |
| 6,092,102 A | 7/2000 | Kanevsky et al. |
| 6,100,882 A | 8/2000 | Sharman et al. |
| 6,134,318 A | 10/2000 | O'Neil |
| 6,144,671 A | 11/2000 | Perinpanathan et al. |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. |
| 6,195,660 B1 | 2/2001 | Polnerow et al. |
| 6,219,413 B1 | 4/2001 | Burg |
| 6,226,374 B1 | 5/2001 | Howell et al. |
| 6,240,449 B1 | 5/2001 | Nadeau |
| 6,260,050 B1 | 7/2001 | Yost et al. |
| 6,275,575 B1 | 8/2001 | Wu |
| 6,282,522 B1 | 8/2001 | Davis et al. |
| 6,296,062 B1 | 10/2001 | Gardell et al. |
| 6,298,062 B1 | 10/2001 | Gardell et al. |
| 6,298,129 B1 | 10/2001 | Culver et al. |
| 6,301,609 B1 | 10/2001 | Aravamudan et al. |
| 6,310,947 B1 | 10/2001 | Polcyn |
| 6,324,269 B1 | 11/2001 | Malik |
| 6,349,299 B1 | 2/2002 | Spencer et al. |
| 6,351,279 B1 | 2/2002 | Sawyer |
| 6,363,143 B1 | 3/2002 | Fox |
| 6,370,137 B1 * | 4/2002 | Lund ............................ 370/352 |
| 6,371,484 B1 | 4/2002 | Yuan |
| 6,385,754 B1 | 5/2002 | Mizumoto et al. |
| 6,389,113 B1 | 5/2002 | Silverman |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,418,214 B1 | 7/2002 | Smythe et al. |
| 6,430,176 B1 * | 8/2002 | Christie, IV ................. 370/355 |
| 6,430,289 B1 | 8/2002 | Liffick |
| 6,442,245 B1 | 8/2002 | Castagna et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. |
| 6,463,145 B1 | 10/2002 | O'Neal et al. |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. |
| 6,480,830 B1 | 11/2002 | Ford et al. |
| 6,480,890 B1 | 11/2002 | Lee, Jr. et al. |
| 6,519,326 B1 | 2/2003 | Milewski et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. |
| 6,563,914 B2 | 5/2003 | Sammon et al. |
| 6,564,261 B1 | 5/2003 | Gudjonsson et al. |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 | 6/2003 | Matthews et al. |
| 6,590,603 B2 | 7/2003 | Sheldon et al. |
| 6,593,352 B2 | 7/2003 | Smith |
| 6,594,352 B1 | 7/2003 | Smith |
| 6,594,470 B1 | 7/2003 | Barnes et al. |
| 6,609,113 B1 | 8/2003 | O'Leary |
| 6,611,590 B1 | 8/2003 | Lu et al. |
| 6,614,786 B1 | 9/2003 | Byers |
| 6,618,710 B1 | 9/2003 | Zondervan et al. |
| 6,625,258 B1 * | 9/2003 | Ram et al. ................. 379/88.13 |
| 6,628,194 B1 | 9/2003 | Hellebust et al. |
| 6,628,770 B1 | 9/2003 | Jain et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,681,119 B1 | 1/2004 | Verdonk |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,697,796 B2 | 2/2004 | Kermani |
| 6,704,294 B1 * | 3/2004 | Cruickshank ................. 370/265 |
| 6,717,938 B1 | 4/2004 | D'Angelo |
| 6,718,178 B1 | 4/2004 | Sladek |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 | 5/2004 | Cline et al. |
| 6,747,970 B1 | 6/2004 | Lamb et al. |
| 6,748,054 B1 | 6/2004 | Gross et al. |
| 6,757,259 B1 | 6/2004 | Hamilton |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |

(56) References Cited

U.S. PATENT DOCUMENTS

| | | |
|---|---|---|
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,947,538 B2 | 9/2005 | Shen et al. |
| 6,954,521 B2 | 10/2005 | Bull et al. |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,107,312 B2 | 9/2006 | Hackbarth et al. |
| 7,116,972 B1 | 10/2006 | Zhang et al. |
| 7,130,390 B2 | 10/2006 | Abburi |
| 7,136,461 B1 | 11/2006 | Swingle et al. |
| 7,139,728 B2 | 11/2006 | Rigole |
| 7,139,782 B2 | 11/2006 | Osaki |
| 7,149,773 B2 | 12/2006 | Haller et al. |
| 7,174,306 B1 | 2/2007 | Haseltine |
| 7,181,417 B1 | 2/2007 | Langseth et al. |
| 7,187,932 B1 | 3/2007 | Barchi |
| 7,209,955 B1 | 4/2007 | Major et al. |
| 7,212,808 B2 | 5/2007 | Engstrom et al. |
| 7,283,808 B2 | 10/2007 | Castell et al. |
| 7,308,087 B2 | 12/2007 | Joyce et al. |
| 7,315,614 B2 | 1/2008 | Bedingfield, Sr. et al. |
| 7,379,538 B1 | 5/2008 | Ali et al. |
| 7,416,090 B2 | 8/2008 | Reding et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0032181 A1 | 10/2001 | Jakstadt et al. |
| 2001/0040954 A1 | 11/2001 | Brachman et al. |
| 2001/0056466 A1* | 12/2001 | Thompson et al. ............ 709/204 |
| 2002/0012425 A1 | 1/2002 | Brisebois et al. |
| 2002/0018550 A1 | 2/2002 | Hafez |
| 2002/0026575 A1 | 2/2002 | Wheeler et al. |
| 2002/0046299 A1 | 4/2002 | Lefeber et al. |
| 2002/0055351 A1 | 5/2002 | Elsey et al. |
| 2002/0069060 A1 | 6/2002 | Cannavo et al. |
| 2002/0071539 A1* | 6/2002 | Diament et al. ......... 379/202.01 |
| 2002/0075303 A1 | 6/2002 | Thompson et al. |
| 2002/0075306 A1 | 6/2002 | Thompson et al. |
| 2002/0076025 A1 | 6/2002 | Liversidge et al. |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0083462 A1* | 6/2002 | Arnott ........................... 725/100 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0103864 A1 | 8/2002 | Rodman et al. |
| 2002/0103898 A1 | 8/2002 | Moyer et al. |
| 2002/0110121 A1 | 8/2002 | Mishra |
| 2002/0115471 A1 | 8/2002 | DeLoye et al. |
| 2002/0137507 A1 | 9/2002 | Winkler |
| 2002/0137530 A1 | 9/2002 | Karve |
| 2002/0146105 A1 | 10/2002 | McIntyre |
| 2002/0147777 A1 | 10/2002 | Hackbarth et al. |
| 2002/0147811 A1 | 10/2002 | Schwartz et al. |
| 2002/0152165 A1 | 10/2002 | Dutta et al. |
| 2002/0177410 A1 | 11/2002 | Klein et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz |
| 2003/0069874 A1 | 4/2003 | Hertzog et al. |
| 2003/0083040 A1 | 5/2003 | Ruth et al. |
| 2003/0083078 A1* | 5/2003 | Allison et al. ................. 455/466 |
| 2003/0092451 A1 | 5/2003 | Holloway et al. |
| 2003/0096626 A1 | 5/2003 | Sabo et al. |
| 2003/0104827 A1 | 6/2003 | Moran et al. |
| 2003/0108172 A1 | 6/2003 | Petty et al. |
| 2003/0112928 A1 | 6/2003 | Brown et al. |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0169330 A1 | 9/2003 | Ben-Shachar et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0019638 A1 | 1/2004 | Makagon et al. |
| 2004/0034700 A1 | 2/2004 | Polcyn |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053221 A1 | 3/2005 | Reding et al. |
| 2005/0102382 A1* | 5/2005 | MacGregor et al. .......... 709/223 |
| 2005/0129208 A1 | 6/2005 | McGrath et al. |
| 2005/0149487 A1 | 7/2005 | Celik |
| 2005/0243993 A1 | 11/2005 | McKinzie et al. |
| 2006/0093120 A1 | 5/2006 | Thorpe et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |

FOREIGN PATENT DOCUMENTS

| | | | |
|---|---|---|---|
| EP | 0818908 A3 | 1/1998 | |
| JP | 59-169264 | 9/1984 | |
| JP | 07-030664 | 1/1995 | |
| JP | 10-013546 | 1/1998 | |
| JP | 2000-270307 | 9/2000 | ............... H04N 7/15 |
| WO | WO 01/11586 A1 | 2/2001 | |
| WO | WO 01/35621 | 5/2001 | |
| WO | WO 01/89212 | 11/2001 | |

OTHER PUBLICATIONS

"FAQ Premium Home Answer" eVoice, http://content.evoice.com/wcs/signUp/FAQ_premHa_s01.htm.

"Voice-ASP, White Paper Technology & Processes," eVoice, Dec. 13, 2000.

(56) References Cited

OTHER PUBLICATIONS

"Voice-ASP, White Paper: Market Opportunities for Enhanced Voicemail," eVoice, Nov. 10, 2000.
"Audio Digitizing Process," TalkBank, http://www.talkbank.org/da/audiodig.html.
"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.
"Macromedia SoundEdit 16 Support Center-Working with Other Programs, What is Shockwave Audio Streaming?" http://www.macromedia.com/support/soundedit/how/shock/whatis.html.
"Chapter 3: Overview," last updated Dec. 2, 1999, http://service.real.com/help/library/guides/g270/htmfiles/overview.htm.
"How Internet Radio Works," Howstuffworks, http://computer.howstuffworks.com/internet-radio.htm/printable.
"Telecommunications and Personal Management Services Linked in Collaboration by Verizon and Microsoft," Oct. 23, 2001, http://www.microsoft.com/presspass/press/2001/oct01/10-23MSVerizonPr.asp.
"Real-Time Collaboration Integration in the Portal," T. Odenwald, SAP Design Guild, http://www.sapdesignguild.org/editions/edition5/synch_collab.asp.
"NetMeeting101," http://www.meetingbywire.com/NetMeeting101.htm.
"NetMeeting102," http://www.meetingbywire.com/NetMeeting102.htm.
"Instructions on Application Sharing and Data Collaboration," VCON Escort and Cruiser, http://www.vide.gatech.edu/docs/share/.
"Instructions on Multipoint Application Sharing and Data Collaboration," VCOM Escort and Cruiser with the RadVision MCU, http://www.vide.gatech.edu/docs/multi-share/.
"File Transfer," Microsoft Windows Technologies Windows NetMeeting, last updated Jun. 4, 1999, http://www.microsoft.com/windows/netmeeting/features/files/default.asp.
"From Dial Tone to Media Tone," Analyst: R. Mahowald, IDC, Jun. 2002.
"MediaTone—The 'Dial Tone' for Web Communications Services," Webex, 2003.
Business Solutions/Professional, http://www.accessline.com/business_sol/bs_professional_body.html.
"Accessline Comms' Accessline Service, The One-Number Wonder," *CommWeb*, T. Kramer, Feb. 1, 2000, http://www.cconvergence.com/article/TCM20000504S0014.
"InteleScreener," 2003, http://www.intelescreener.com/howitworks.html.
"TeleZapper from Privacy Technologies," Privacy Corps—Our Review, 2002, http://www.privacycorps.com/pages/product1.htm.
"A Proposal for Internet Call Waiting Service Using SIP," A. Brusilovsky et al., Lucent Technologies, PINT Working Group, Internet Draft, Jan. 1999.
"A Model for Presence and Instant Messaging," M. Day et al., Fujitsu, Feb. 2000, Network Working Group, Request for Comments 2778.
Data Connection, Strategic Computer Technology, MeetingServer, "Broadband for Learning Case Study," Data Connection Ltd, 1998-2004, http://www.dataconnection.com/conferencing/meetingserver_casestudy.htm.
Data Connection, MailNGen, "Next Generation Messaging for Service Providers," Data Connection Limited, Apr. 2003.
Data Connection, Strategic Computer Technology, "Directories Explained," Data Connection Ltd, 1998-2004, http://www.dataconnection.com/inetapps/direxpl.htm.
Data Connection, Strategic Computer Technology, Directory Systems, "Directories and Meta-Directories," Data Connection Ltd, 1998-2004, http://www.dataconnection.com/inetapps/directory.htm.
Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.
Data Connection, Strategic Software Technology, "DC-SurroundSuite for Service Providers," Data Connection Ltd, 1998-2000, http://web.archive.org/web/20000914200355/www.dataconnection.com/messging/spssuite.htm.
Data Connection, Strategic Computer Technology, "Messaging Software Products and Services," Data Connection Ltd, 1998-2000, http://web.archive.org/web/20000819063320/www.dataconnection.com/messging/messgidx.htm.
Data Connection, Strategic Software Technology, "DC-Share for Unix," Data Connection Ltd, 1998-2000, http://web.archive.org/web/20000914200713/www.dataconnection.com/conf/DCshare.htm.
Data Connection, Strategic Software Technology, "DC-H.323," Data Connection Ltd, 1998-2000, http://web.archive.org/web/20001120050600/www.dataconnection.com/conf/h323.htm.
Data Connection, Strategic Software Technology, "DC-WebShare," Data Connection Ltd, 1998-2000, http://web.archive.org/web/20001016115016/www.dataconnection.com/conf/webshare.htm.
Data Connection, Strategic Computer Technology, "DC-Recorder," Data Connection Ltd, 1998-2000, http://web.archive.org/web/20001016055611/www.dataconnection.com/conf/recorder.htm.
Data Connection, Strategic Software Technology, "DC-MeetingServer," Data Connection Ltd, 1998-2000, http://web.archive.org/web/20000914200719/www.dataconnection.com/conf/meetingserver.htm.
Data Connection, Strategic Computer Technology, "DC-MeetingServer," Data Connection Ltd, 1998-2000, http://web.archive.org/web/20021201144529/www.dataconnection.com/inetapps/conferencing.htm.
Data Connection, Strategic Software Technology, "DC-VoiceNet Features," Data Connection Ltd, 1998-2000, http://web.archive.org/web/20001016102614/www.dataconnection.com/messging/vnfeat.htm.
Data Connection, Strategic Software Technology, "DC-VoiceNet," Data Connection Ltd, 1998-2000, http://web.archive.org/web/20000914200424/www.dataconnection.com/messging/vnet.htm.
Data Connection, Strategic Computer Technology, "Messaging Software Products and Services," Data Connection Ltd, 1998-2000, http://web.archive.org/web/20010305143803/www.dataconnection.com/messging/messgidx.htm.
Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.
Data Connection, "SmartDialer Functional Overview," Version v1.0, Internet Applications Group, Data Connection Ltd., Nov. 3, 2003.
Data Connection, "SIP Market Overview, An analysis of SIP technology and the state of the SIP Market," Jonathan Cumming, Data Connection Ltd., 2003-2004.
Data Connection, "Integrating Voicemail Systems, A white paper describing the integration of heterogeneous voicemail systems," Michael James, Internet Applications Group, Data Connection Ltd., 2004.
Data Connection, Strategic Computer Technology, "MailNGen: Next generation messaging for Service Providers," Data Connection Ltd, 1998-2004, http://www.dataconnection.com/messaging/.
Data Connection, Strategic Computer Technology, "MailNGen: Unified Messaging," Data Connection Ltd, 1998-2004, http://www.dataconnection.com/messaging/unified_messaging.htm.
Data Connection, Strategic Computer Technology, "MeetingServer: The award-winning web conferencing solution for Service Providers," Data Connection Ltd, 1998-2005, http://www.dataconnection.com/conferencing/.
Data Connection, Strategic Computer Technology, "MeetingServer: The web conferencing solution for Service Providers," Data Connection Ltd, 1998-2004, http://www.dataconnection.com/conferencing/meetingserver.htm.
Data Connection, Strategic Computer Technology, "MeetingServer: Web conferencing architecture," Data Connection Ltd, 1998-2004, http://www.dataconnection.com/conferencing/meetingserver_arch.htm.
U.S. Appl. No. 09/828,679, filed Apr. 6, 2001, Craig Reding at al. cited by other.

(56) References Cited

OTHER PUBLICATIONS

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

White, "How Computers Work", Millennium Edition, 1999, Que Corporation, Indianapolis, IN, all pages.

Derfler, "How Networks Work," Bestseller Edition, 1996, Ziff-Davis Press, Emeryville, CA, all pages.

Gralla, "How the Internet Works," Millennium Edition, 1999, Que Corporation, Indianapolis, IN, all pages.

Muller, "Desktop Encyclopedia of the Internernet," 1999, Artech House Inc., Norwood, MA, all pages.

US. Appl. No. 09/828,679, filed Apr. 6, 2001, Craig Reding et al.

"The Mobile Phone User Guide", http://www.mobileshop.org/usertech/wildfire.htm, printed Oct. 1, 2004.

Kornowski, J., "Wildfire at Your Back and Call-A Voice-Activated Telephone Assistant That Minds You and Your Messages", http://www.lacba.org/lalawyer/techwildfire.html, pronted Oct. 1, 2004.

Cisco Personal Assistant 1.4. Cisco Systems, Jun. 24, 2003, http://www.cisco.com/en/US/products/sw/voicesw/ps2026/prod_presentation_list.html, printed Oct. 1, 2004.

Kranzler: Alarm . . . and instant messaging; WO01/11586A1, Feb. 15, 2001, mrk.

\* cited by examiner

TELEPHONE / NETWORK ADDRESS TABLE
405

| CALLER ID 415 | NETWORK ADDRESS 420 |
|---|---|
| 111-222-3333 | 128.96.33.81 |
| 111-222-4444 | 95.42.88.82 |
| 111-222-5555 | 128.23.94.12 |

TABLE ENTRIES 410

SYSTEMS AND METHODS FOR IMPLEMENTING INTERNET VIDEO CONFERENCING USING STANDARD PHONE CALLS

CROSS REFERENCE TO RELATED APPLICATIONS

This is a continuation of U.S. patent application Ser. No. 10/083,607 filed Feb. 26, 2002, which has now issued as U.S. Pat. No. 6,750,897, which claims priority from the benefit of provisional application No. 60/312,910, filed Aug. 16, 2001, which is incorporated by reference herein in its entirety.

FIELD OF THE INVENTION

The present invention relates generally to systems and methods for video conferencing and, more particularly, to systems and methods that implement packet-switched video conferencing initiated by circuit-switched telephone calls.

BACKGROUND OF THE INVENTION

For years videophones have been viewed as a futuristic technological endeavor. Even with the advent of high-speed Internet access, the promise of reliable, high quality videophones has not been realized. Conventional video conferencing has a number of disadvantages. Traditional video conferencing requires specialized, costly equipment for each participant in the conference. Significant bandwidth, additionally, must be dedicated to the video conferencing session, thus, requiring at least IDSN or better service. Also, the specialized equipment used is costly and, thus, prohibitive for use by the general public, and generally involves large video conferencing units that must be located in specially designated areas.

Internet video conferencing has alleviated some of the problems attendant with traditional video conferencing, including the use of desktop computers equipped with video cameras and audio microphones instead of large, expensive, and specialized video conferencing equipment. The quality of video and audio in conventional Internet video conferencing, however, has been found to be relatively poor. Additionally, other problems exist in Internet video conferencing, including difficulties in reaching others involved in the conferencing, requiring knowledge of the other party's IP address or the location of a directory service on which the other party is listed.

Therefore, there exists a need for systems and methods that permit the implementation of Internet video conferencing with high video and audio quality, and without requiring knowledge, by conference participants, of the other party's IP addresses, or the location of the directory services on which the other parties are listed.

SUMMARY OF THE INVENTION

Systems and methods consistent with the present invention address this and other needs by enabling video conferencing using a circuit-switched telephone connection for audio, and a high-speed DSL connection for transmitting packetized video between parties to the conference. At the time a call is placed between a calling party number and a called party number in a circuit-switched network, a server references each of the party numbers to network addresses in a packet-switched network. The server sends these network addresses to respective nodes in the packet-switched network associated with each of the called and calling parties. The respective nodes may use the received network addresses to transfer packetized video, captured contemporaneously with audio transmitted via a circuit-switched network, between each of the parties to the circuit-switched telephone connection. With the packetized video transmitted at a DSL rate, and the audio data transmitted at conventional circuit-switched rates, high quality video conferencing may be obtained. Furthermore, in other embodiments of the invention, the respective nodes may use the received network addresses to transfer both packetized audio and video between each of the parties to the circuit-switched telephone connection.

In accordance with the purpose of the invention as embodied and broadly described herein, a method of video conferencing includes establishing a circuit-switched connection between a first party and a second party; and establishing, responsive to the establishment of the circuit-switched connection, a packet-switched connection between the first party and the second party to transmit video.

In another implementation consistent with the present invention, a method of setting up a video conference includes receiving a calling party number and a called party number used for establishing a connection in a circuit-switched network; associating a first network address in a packet-switched network with the calling party number; associating a second network address in the packet-switched network with the called party number; sending a first message containing the second network address to the first network address via the packet-switched network; and sending a second message containing the first network address to the second network address via the packet-switched network.

In yet another implementation consistent with the present invention, a method of video conferencing includes establishing a circuit-switched connection between a calling party number and a called party number; associating first and second network addresses in a packet-switched network with each of the called party and calling party numbers; transmitting audio data via the circuit-switched connection; and transmitting packetized video between the first and second network addresses responsive to establishment of the circuit-switched connection.

In a further implementation consistent with the present invention, a method of video conferencing includes capturing audio contemporaneously with video at a first location; capturing audio contemporaneously with video at a second location; transmitting the captured audio between the first location and the second location via a circuit-switched network; and transmitting the captured video between the first and second location via a packet-switched network.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods, consistent with the present invention, provide mechanisms that enable high quality video conferencing through the transmission of audio via a circuit-switched network (or possibly a packet-switched network), and through the transmission of packetized video, captured contemporaneously with the audio, via a high-speed DSL connection and the packet-switched network.

Exemplary Network

Figure 1:
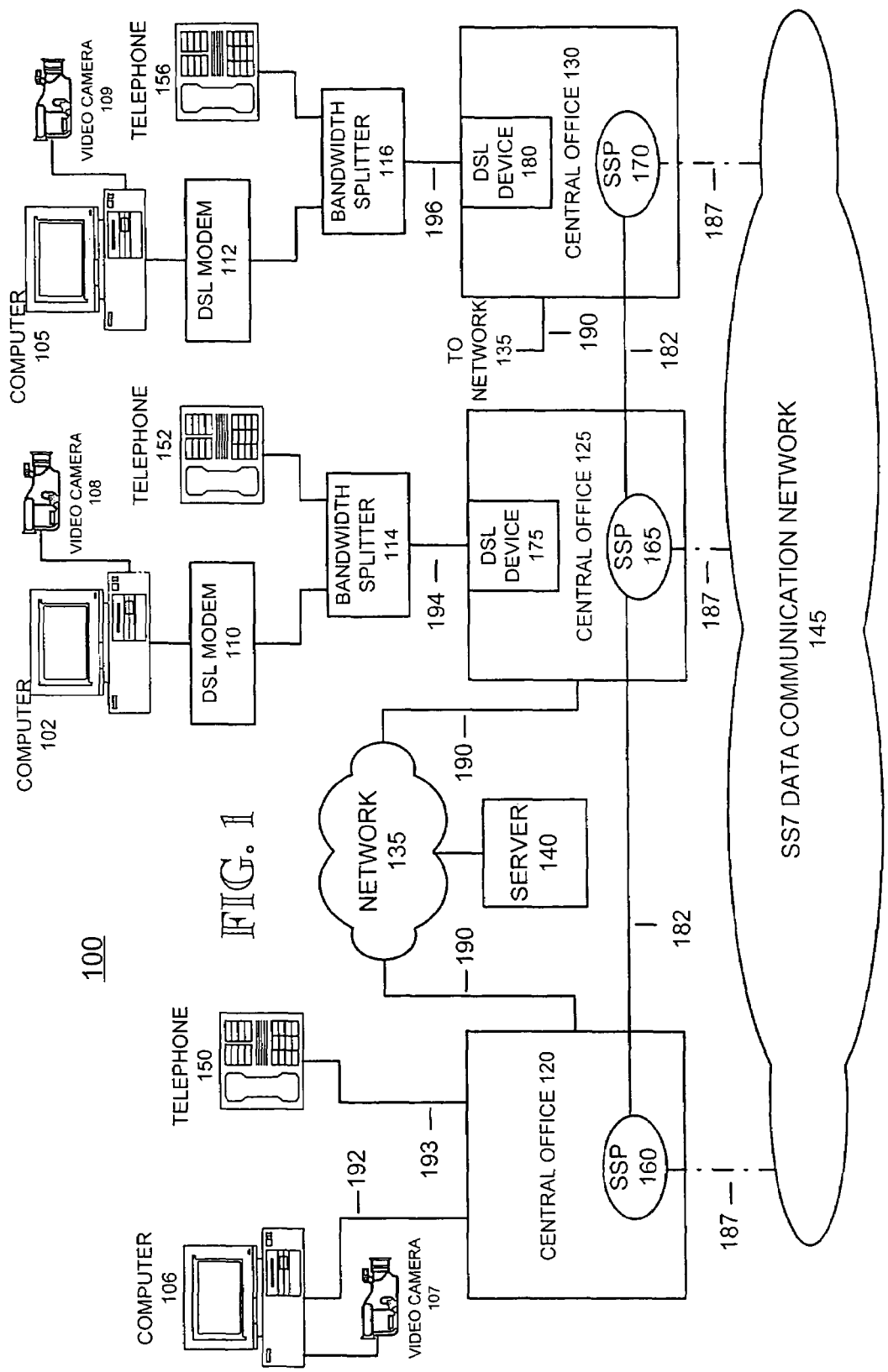
FIG. 1 illustrates an exemplary network in which systems and methods, consistent with the present invention, may be implemented.

FIG. 1 illustrates an exemplary network 100 in which systems and methods, consistent with the present invention, implement packet-switched video conferencing initiated by a standard circuit-switched telephone call. Network 100 may include computers 102, 105 and 106; video cameras 107, 108, 109; digital subscriber line (DSL) modems 110 and 112; bandwidth splitters 114 and 116; central offices 120, 125 and 130; network 135; server 140; a Signaling System Number 7 (SS7) data communication network 145; and telephones 150, 152 and 156. Telephones 150, 152 and 156 can include any type of conventional telephony devices known within the art. Central offices 120, 125 and 130 may include conventional service switching points (SSPs) 160, 165 and 170, respectively, for establishing circuit-switched connections. Central offices 125 and 130 may further include conventional DSL devices 175 and 180, respectively.

Computer 102 may connect to DSL device 175 of central office 125 via DSL modem 110 and bandwidth splitter 114. DSL modem 110 can receive data from computer 102 and transmit the received data to bandwidth splitter 114 over a data frequency band. DSL modem 110 can further receive voice data from telephone 152 and transmit the received data to bandwidth splitter 114 over a voice frequency band. Bandwidth splitter 114 can combine data received over data and voice frequency bands for transmission to DSL device 175 via telephone line 194. Bandwidth splitter 114 can further separate voice band frequencies and data band frequencies received from DSL device 175 via telephone line 194.

Computer 105 may connect to DSL device 180 of central office 130 via DSL modem 112 and bandwidth splitter 116. DSL modem 112 can receive data from computer 105 and transmit the received data to bandwidth splitter 116 over a data frequency band. DSL modem 112 can further receive voice data from telephone 156 and transmit the received data to bandwidth splitter 116 over a voice frequency band. Bandwidth splitter 116 can combine data received over data and voice frequency bands for transmission to DSL device 180 via telephone line 196. Bandwidth splitter 116 can further separate voice band frequencies and data band frequencies received from DSL device 180 via telephone line 196.

Computer 106 and telephone 150 may connect to central office 120 via separate telephone lines 192 and 193, respectively.

Computers 102, 105 and 106 may connect to network 135 via links 190 and central offices 120, 125 and 130, respectively. Network 135 may include one or more connection-less or connection-oriented packet-switched networks, including local area networks (LANs), metropolitan area networks (MANs), wide area networks (WANs), an intranet, or the Internet. Such networks may employ any conventional packet-switched protocol including, but not limited to, Internet Protocol (IP) or Asynchronous Transfer Mode (ATM). Computers 102, 105 and 106 may each be collocated with respective telephones 152, 156 and 150 such that a user may converse via a telephone and view video on a video monitor of a computer.

Server 140 can include a network node that receives and processes data packets from network 135. Server 140 can connect to network 135 via wired, wireless or optical connection links. Server 140 may initiate the establishment of packetized video (and possibly packetized audio) transfer between two computers (e.g., computer 106 and computer 102, or computer 102 and computer 105) using a database that associates network addresses in network 135 of the computers, with telephone numbers of telephones (e.g., telephones 150, 152 and 156) that are collocated with each computer.

SS7 network 145 can include a conventional network that uses SS7 signaling protocols for setting up telephone calls between SSPs 160, 165 and 170. Network 145 can include conventional service control points (SCPs) and signal transfer points (STP) for routing calls between SSPs.

SSPs 160, 165 and 170 may include conventional network nodes having SS7 messaging capability. SSPs 160, 165 and 170 connect with one another via links 182. Links 182 include circuits for connecting calls between telephones 150, 152 and 156. SSPs 160, 165 and 170 may be connected to SS7 network 145 via links 187.

Exemplary Computer

Figure 2:
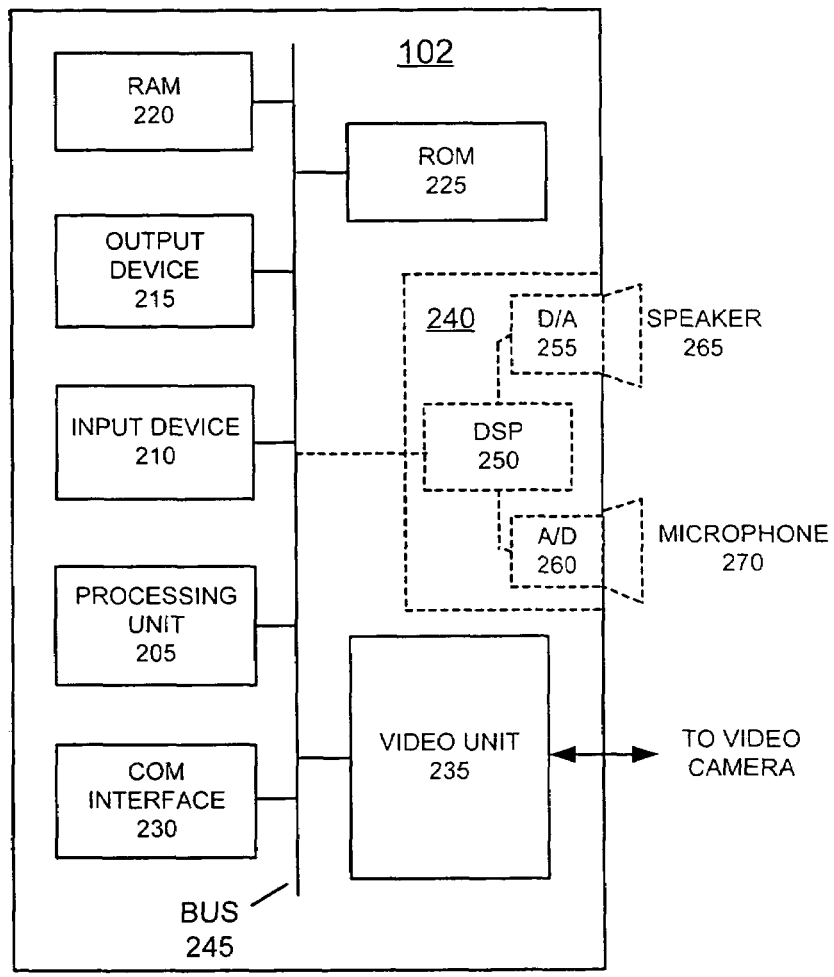
FIG. 2 illustrates exemplary components of a computer consistent with the present invention.

FIG. 2 illustrates an exemplary computer 102 in which systems and methods, consistent with the present invention, may be implemented for setting up packet-switched video conferencing between a calling party and a called party at, for example, telephones 152 and 156. Computer 102 may include a processing unit 205, an input device 210, an output device 215, a Random Access Memory (RAM) 220, a Read Only Memory (ROM) 225, a communication interface 230, a video unit 235, an optional packetized telephone peripheral 240, and a bus 245.

Processing unit 205 may perform all data processing functions for inputting, outputting, and processing of data. Input device 210 permits entry of data into computer 102 and includes one or more user interfaces (not shown), such as a keyboard, a mouse or the like. Output device 215 permits the output of data in video, audio, or hard copy format.

RAM 220 provides semi-permanent working storage of data and instructions for use by processing unit 205. ROM 225 provides permanent or semi-permanent storage of data and instructions for use by processing unit 205. RAM 220 and ROM 225 may include large-capacity storage devices, such as a magnetic and/or optical recording medium and its corresponding drive. Communication interface 230 includes conventional mechanisms for connecting computer 102 to network 135. Video unit 235 may include conventional circuitry for framing, encoding and packetizing video received from a video camera.

Packetized telephone peripheral 240 may include a digital signal processor (DSP) 250, a digital-to-analog (D/A) converter 255, an analog-to-digital (A/D) converter 260, a speaker 265 and a microphone 270. DSP 250 may perform functions, such as packet buffering, voice coding, equalization, and audio data processing. D/A converter 255 includes conventional circuitry for converting digital audio signals to analog signal form for output, for example, via speaker 265. Speaker 265 includes a conventional mechanism for providing an auditory output of the D/A-converted audio signals. A/D converter 260 includes conventional circuitry for sampling and converting analog audio input signals from microphone 270 to digital signal form. Microphone 270 includes a conventional mechanism for converting auditory input into analog signals.

Bus 245 interconnects the various components of computer 102 to permit the components to communicate with one another.

Exemplary Server

Figure 3:
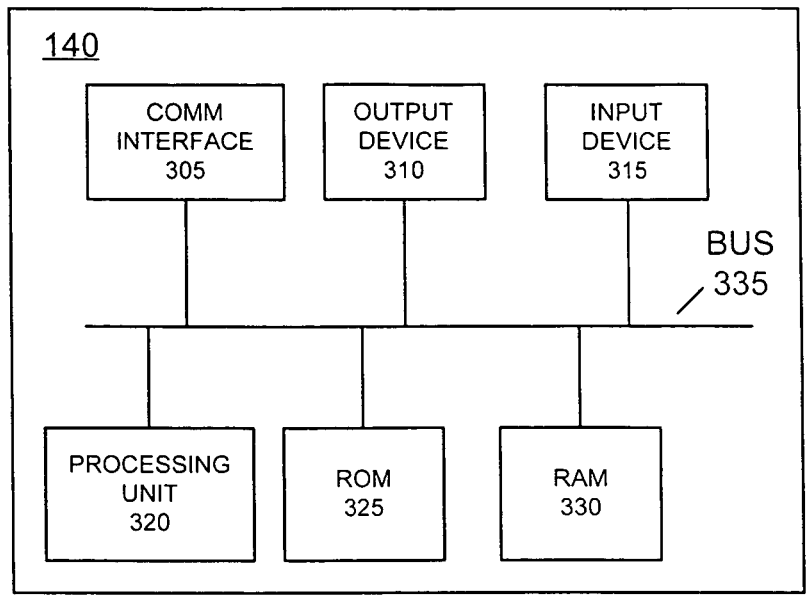
FIG. 3 illustrates exemplary components of a server consistent with the present invention.

FIG. 3 illustrates an exemplary server 140, consistent with the present invention, which is configured to process calling and called party numbers received from a central office (e.g., central offices 120, 125, 130). Server 140 includes a communication interface 305, an output device 310, an input device 315, a processing unit 320, a ROM 325, a RAM 330, and a bus 335.

Communication interface 305 includes conventional mechanisms for connecting server 140 with network 135. Output device 310 permits the output of data in video, audio, or hard copy format. Input device 315 permits entry of data into server 140 and includes a user interface (not shown). Processing unit 320 performs all data processing functions for inputting, outputting, and processing of data. ROM 325 provides permanent or semi-permanent storage of data and instructions for use by processing unit 320. RAM 330 provides semi-permanent working storage of data and instructions for use by processing unit 320. ROM 325 and RAM 330 may include large-capacity storage devices, such as a magnetic and/or optical recording medium and its corresponding drive. Bus 335 interconnects the various components of server 140 to permit the components to communicate with one another.

Exemplary Database

Figures 4A, 4B:
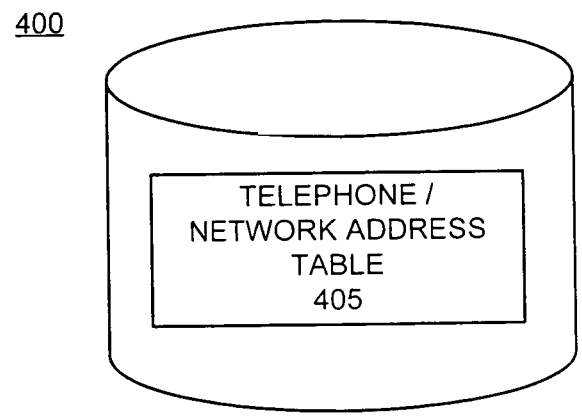
FIG. 4A illustrates an exemplary database consistent with the present invention.
FIG. 4B illustrates an exemplary table stored in the database of FIG. 4A consistent with the present invention.

FIG. 4A illustrates an exemplary database 400 that may be stored in, for example, RAM 330 of server 140 or may be located external to server 140. Database 400 may include a telephone/network address table 405 that associates network addresses (e.g., IP addresses) with caller identifiers (e.g., telephone numbers).

FIG. 4B illustrates an exemplary telephone/network address table 405. Table 405 may include multiple entries 410, with each entry associating a given caller identifier 415 with a network address 420 (e.g., an IP address) for setting up a packet-switched video connection. Table 405 may, thus, be used to retrieve a network address 420 based on a caller identifier number 415 (e.g., a telephone number).

Exemplary Video Conferencing Process

Figure 5:
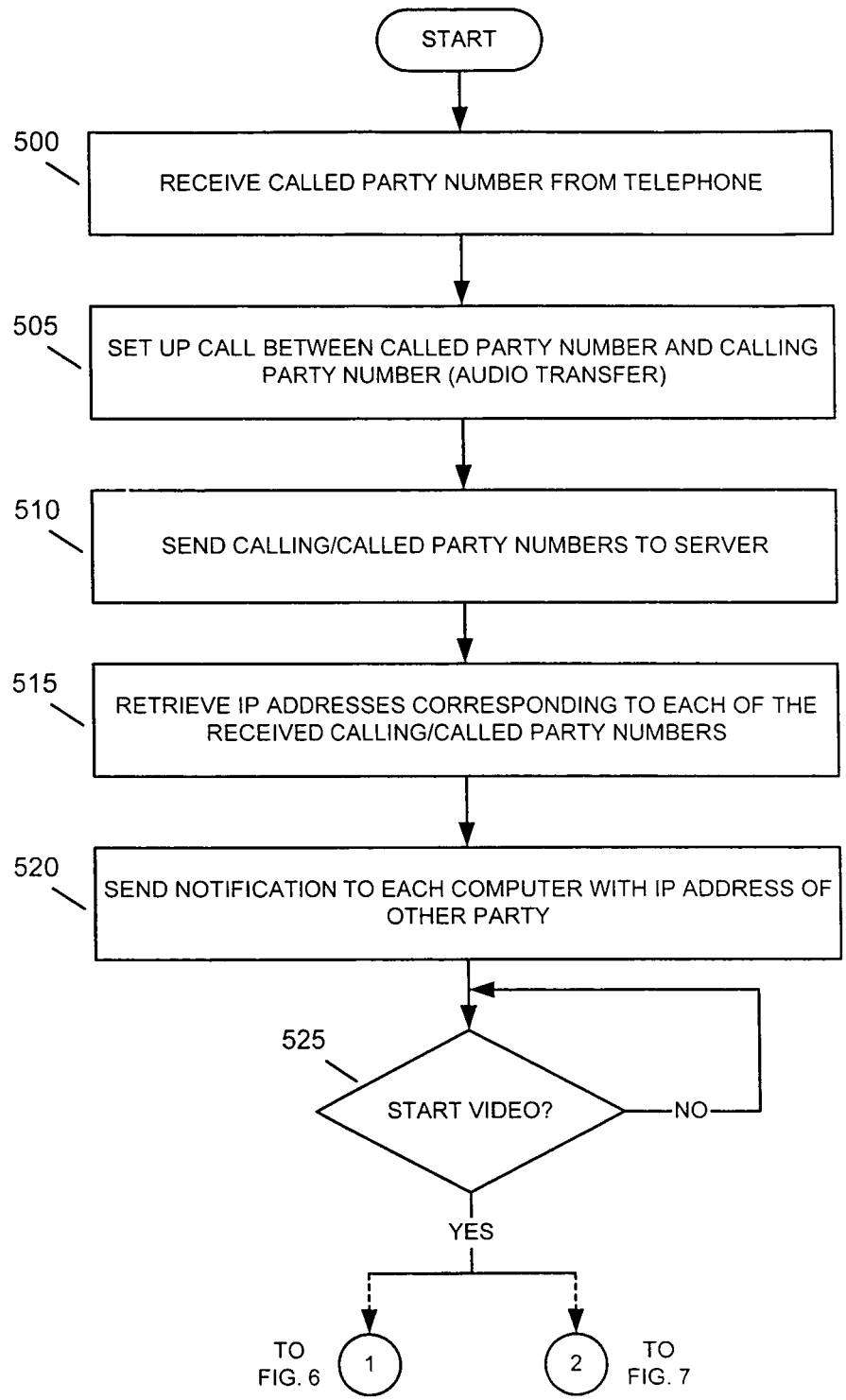
FIGS. 5-7 are flowcharts that illustrate an exemplary process for setting up an audio and video connection between two callers consistent with the present invention.
Figure 6:
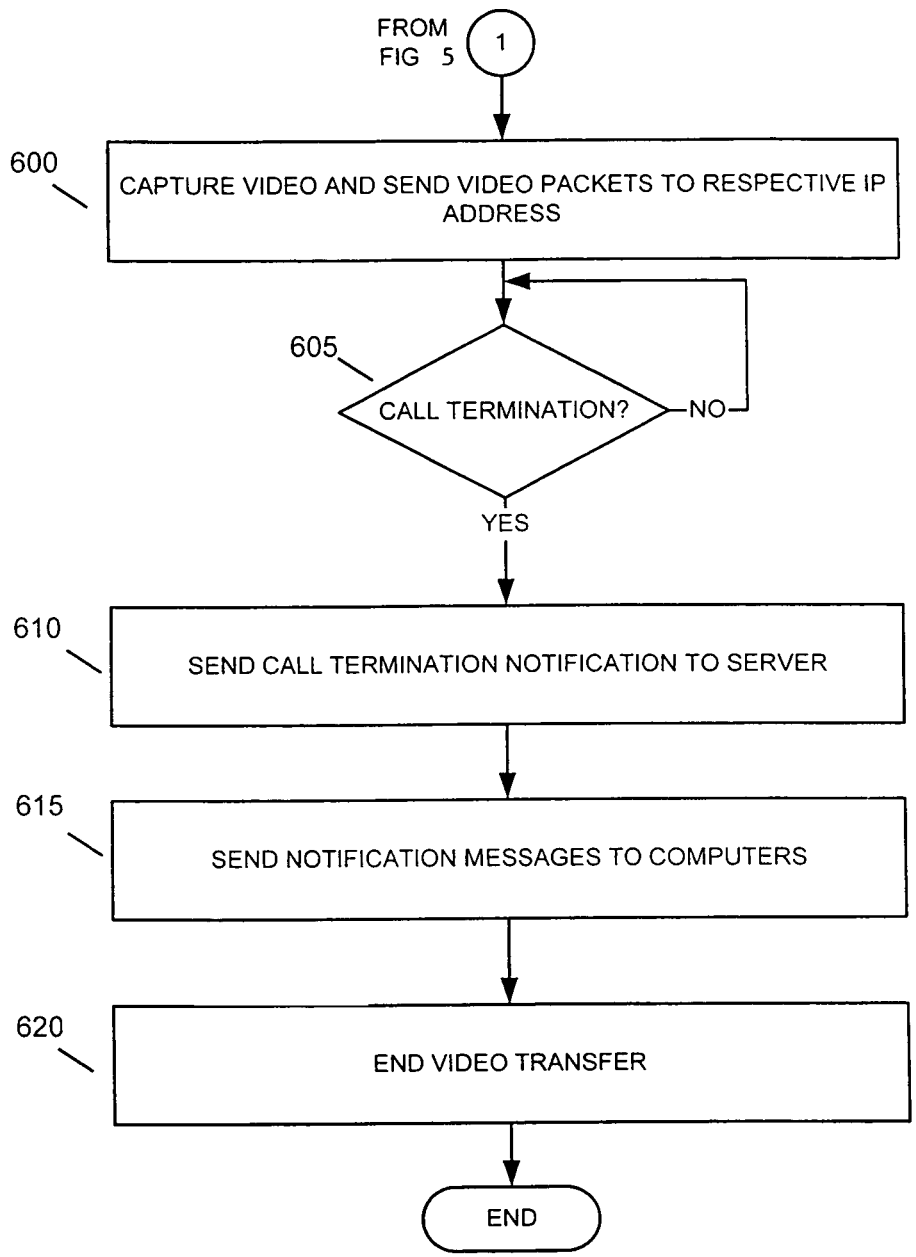
Figure 7:
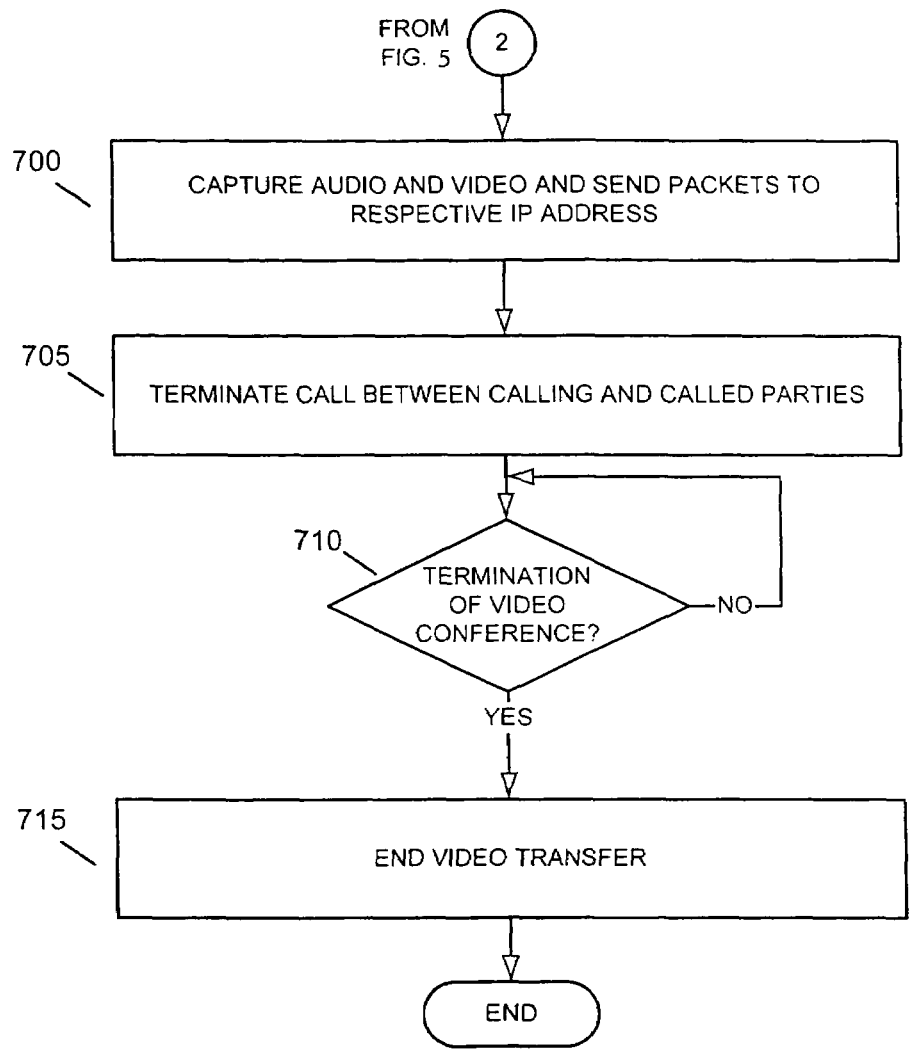

FIGS. 5-7 are flowcharts that illustrate an exemplary process, consistent with the present invention, for setting up a video conference between two callers. The videoconference may include audio transmitted via a circuit-switched network (or a packet-switched network) and video transmitted via the packet-switched network at, possibly, a DSL rate.

Figure 8:
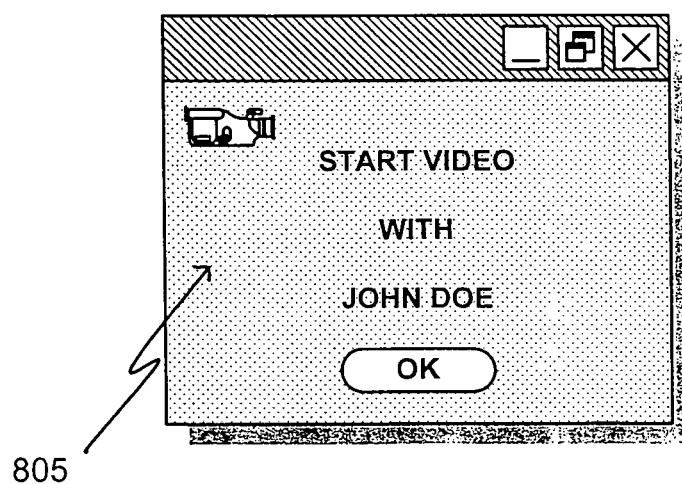
FIG. 8 illustrates an exemplary window of a graphical user interface consistent with the present invention.

To begin the exemplary process, a central office (e.g., central office 125) may receive a called party number from a telephone (e.g., telephone 152) [act 500]. The central office and SS7 network 145 may set up a circuit-switched audio connection between the called party number and the number of the calling party [act 505]. The number of the calling party may be retrieved using, for example, conventional "caller ID." The central office may further send a video set-up message containing the called and calling party numbers to server 140 via network 135 [act 510]. Server 140 may look up, in table 405 of database 400, network addresses 420 corresponding to each of the received calling/called party numbers [act 515]. The network addresses identify the computers associated with the calling and called parties. Server 140 may then send a notification message to each computer (i.e., the calling party's computer and the called party's computer) with the network address (e.g., IP address) of the other party to the call [act 520]. Server 140 may use, for example, conventional instant messaging techniques to send the notification messages to each computer. Each computer determines whether video transfer should be started [act 525]. As shown in FIG. 8, each party may "click" on an appropriate "button" in a window 805 of a computer graphical user interface, for example, to start video transfer. If video transfer is initiated, a number of different techniques may be used for transferring audio and video between the calling and called parties. In a first technique, shown in FIG. 6, audio may be sent via the circuit-switched network and video may be sent via the packet-switched network. In a second technique, shown in FIG. 7, both audio and video may be sent via the packet-switched network subsequent to call set-up over the circuit-switched network.

Turning to the technique shown in FIG. 6, each computer may capture video, via a video camera (e.g., video camera 107, 108 or 109), and send video packets to the IP address associated with the other party [act 600]. SS7 network 145 may determine if the already established circuit-switched call between the two parties has been terminated [act 605]. If so, SS7 network 145 may send a call termination notification to server 140 [act 610]. In turn, server 140 may send termination notification messages to the computers engaged in the video conferencing via network 135 [act 615]. Each computer, in response to receipt of a termination notification message, may end the video transfer [act 620].

In the technique shown in FIG. 7, each computer may capture video, via a video camera (e.g., video camera 107, 108 or 109) and audio, via a microphone 265 and a DSP 245, and send audio and video packets to the IP address associated with the other party [act 700]. After video and audio transfer is established between computers associated with each of the calling and called parties, the already established circuit-switched call between the calling party number and the called party number may be terminated [act 705]. For example, server 140 may notify SS7 network 145 that the circuit-switched connection between the calling party number and the called party number may be terminated. SS7 network 145 may then, accordingly, end the circuit-switched connection. Each computer (i.e., the calling party's computer and the called party's computer) may then determine whether audio and video transfer has been terminated by either party [act 710]. If so, each computer involved in the audio and video transfer may end the transfer of the packets, containing the audio and video data, via packet-switched network 135 [act 715].

CONCLUSION

Systems and methods, consistent with the present invention, provide mechanisms that enable video conferencing using a circuit-switched telephone connection for audio, and a high-speed DSL connection for transmitting packetized video between parties to the conference. When a call is placed between a calling party number and a called party number in a circuit-switched network, a server references each of the party numbers to network addresses in a packet-switched network. The server sends these network addresses to respective nodes in the packet-switched network associated with each of the called and calling parties. The respective nodes may use the received network addresses to transfer packetized video, captured contemporaneously with audio transmitted via a circuit-switched network, between each of the parties to the circuit-switched telephone connection. With the packetized video transmitted at a high speed rate (e.g., a DSL rate), and the audio data transmitted at conventional circuit-switched rates, high quality video conferencing may be obtained. Furthermore, in other embodiments consistent with the invention, the respective nodes may use the received network addresses to transfer both packetized audio and video between each of the parties to the circuit-switched telephone connection.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, the present invention is applicable to establishing audio connections via cell phones or other mobile telephony devices. Also, while each computer (e.g., computers 102, 105 and 106) of FIG. 1 is shown as a separate device from each corresponding telephone (e.g., telephones 150, 152 and 156), the functions of both could be combined in a single device (e.g., a computer) such that the computer may send audio via a circuit-switched connection and video via a packet-switched connection.

While series of acts have been described with regard to FIGS. 5-7, the order of the acts may be altered in other implementations. Moreover, non-dependent acts may be performed in parallel. No element, step, or instruction used in the description of the present application should be construed as critical or essential to the invention unless explicitly described as such. The scope of the invention is defined by the following claims and their equivalents.

What is claimed is:

1. A server comprising:
a memory to:
   store data that associates telephone numbers and network addresses; and
a processor to:
   receive a first telephone number and a second telephone number if the telephone numbers,
      the first telephone number and the second telephone number being associated with a first connection between a first telephone device associated with the first telephone number and a second telephone device associated with the second telephone number,
   retrieve, from the memory, a first network address and a second network address, of the network addresses, using, respectively, the first telephone number and the second telephone number,
      the first network address being associated with a first node,
      the second network address being associated with a second node, and
      the first node being different from the first telephone device and the second node being different from the second telephone device,
   send, to the first node, a first message that identifies the second network address,
   send, to the second node, a second message that identifies the first network address,
   initiate, via a packet-switched network, a second connection between the first node and the second node using the first network address and the second network address, and
   terminate, based on initiating the second connection, the first connection between the first telephone device and the second telephone device.

2. The server of claim 1, where the network addresses comprise Internet Protocol (IP) addresses.

3. The server of claim 1, where the processor, when sending the first message and the second message, is further to:
   send at least one of the first message and the second message via a short message service (SMS).

4. The server of claim 1, where the processor, when initiating the second connection, is further to:
   establish, via the second connection, a video conference between the first node and the second node.

5. The server of claim 1, where the processor, when retrieving the first network address and the second network address, is further to:
   search the memory using the first telephone number to identify the first network address, and
   search the memory using the second telephone number to identify the second network address.

6. The server of claim 1, where the processor is further to:
   receive return messages from each of the first node and the second node based on sending the first message and the second message, and
   determine, based on the return messages, whether the first node and the second node accept the second connection,
      the processor initiating the second connection further based on the first node and the second node accepting the second connection.

7. The server of claim 1, where the memory, when storing the data that associates the telephone numbers and the network addresses, is further to:
   store information identifying the network addresses, and
   index the information identifying the network addresses using information identifying the telephone numbers.

8. A method comprising:
   associating, by a server device, a plurality of telephone numbers and a plurality of network addresses in a packet-switched network,
      the plurality of telephone numbers corresponding to a plurality of circuit-switched devices, and
      the plurality of network addresses corresponding to a plurality of nodes in the packet-switched network,
         the plurality of circuit-switched devices being different from the plurality of nodes;
   detecting, by the server device, a circuit-switched connection between two circuit-switched devices of the plurality of circuit-switched devices,
      the two circuit-switched devices being associated with two telephone numbers of the plurality of telephone numbers;
   identifying, by the server device, two network addresses, of the plurality of network addresses, associated, respectively, with the two telephone numbers;

establishing, by the server device and based on the two network addresses, a packet-switched connection between two nodes of the plurality of nodes,
    the two nodes being associated with, respectively, two network addresses; and
terminating, by the server device, the circuit-switched connection based on establishing the packet-switched connection.

9. The method of claim 8, where the plurality of network addresses comprise Internet Protocol (IP) addresses.

10. The method of claim 8, where associating the plurality of telephone numbers and the plurality of network addresses includes:
    storing, at a remote device, data associating the plurality of telephone numbers and the plurality of network addresses,
    where identifying the two network addresses further comprises:
        retrieving, from the remote device, the two network addresses via the packet-switched network.

11. The method of claim 8,
where the packet-switched connection, between the two nodes, transmits data associated with a video conference.

12. The method of claim 8, further comprising:
sending a first network address, of the two network addresses, to a first node of the two nodes,
    the first network address being associated with a second node of the two nodes; and
sending a second network address, of the two network addresses, to the second node,
    the second network address being associated with the first node,
    the packet-switched connection being establishing based on the sending the first network address and the second network address.

13. The-method of claim 8, further comprising:
sending, to the two nodes, requests for acceptance of the packet-switched connection;
receiving respective return messages from the two nodes based on sending the requests; and
determining, based on the respective return messages, that the two nodes accept the packet-switched connection,
    the packet-switched connection being established based on determining that the two nodes accept the packet-switched connection.

14. The method of claim 13, where sending the requests includes:
sending one or more of the requests via a short message service (SMS).

15. A method comprising:
detecting, by a network device, a circuit-switched connection between a first device and a second device,
    the first device and the second device being associated with, respectively, a first party and a second party;
retrieving, by the network device and based on detecting the circuit-switched connection, a first network address for a first node associated with the first party and a second network address for a second node associated with the second party,
    the first node and the second node being different from the first device and the second device;
sending, by the network device, information identifying the second network address to the first node;
sending, by the network device, information identifying the first network address to the second node;
establishing, by the network device and based on the first network address and second network address, a packet-switched connection between the first node and the second node; and
terminating, by the network device, the circuit-switched connection based on establishing the packet-switched connection.

16. The method of claim 15, where the first network address and second network address are retrieved from a device remote from the first party and the second party.

17. The method of claim 7, where the first network address and the second network address comprise addresses in a packet-switched network, and
where the packet-switched connection is established via the packet-switched network.

18. The method of claim 17, where the first network address and the second network address comprise Internet Protocol (IP) addresses.

19. The method of claim 15,
where the packet-switched connection transmits data associated with a video conference between the first party and the second party.

20. The method of claim 15, further comprising:
sending, to the first node and the second node, respective requests for acceptance of the packet-switched connection;
receiving respective return messages from the first node and the second node based on sending the requests; and
determining, based on the respective return messages, that the first node and the second node accept the packet-switched connection,
the packet-switched connection being established based on determining that the first node and the second node accept the packet-switched connection.

\* \* \* \* \*